United States Patent
Tarasov et al.

(10) Patent No.: US 12,056,511 B2
(45) Date of Patent: Aug. 6, 2024

(54) CONTAINER IMAGE CREATION AND DEPLOYMENT USING A MANIFEST

(71) Applicant: International Business Machines Corporation, Armonk, NY (US)

(72) Inventors: Vasily Tarasov, Moorpark, CA (US); Lukas Rupprecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 17/093,355

(22) Filed: Nov. 9, 2020

(65) Prior Publication Data

US 2022/0147378 A1   May 12, 2022

(51) Int. Cl.
| | |
|---|---|
| G06F 9/455 | (2018.01) |
| G06F 9/50 | (2006.01) |
| G06F 9/54 | (2006.01) |
| G06F 16/13 | (2019.01) |
| G06F 16/188 | (2019.01) |

(52) U.S. Cl.
CPC .......... *G06F 9/455* (2013.01); *G06F 9/45558* (2013.01); *G06F 9/5077* (2013.01); *G06F 9/54* (2013.01); *G06F 9/545* (2013.01); *G06F 16/13* (2019.01); *G06F 16/137* (2019.01); *G06F 16/188* (2019.01); *G06F 16/196* (2019.01); *G06F 2009/45562* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,783,967 B1 * | 8/2010 | Carnell | G06F 16/958 |
| | | | 715/234 |
| 9,766,915 B1 | 9/2017 | Emelyanov | |
| 9,823,915 B1 * | 11/2017 | Maloney | G06F 9/4411 |
| 10,291,706 B1 | 5/2019 | Zhao et al. | |
| 10,324,708 B2 | 6/2019 | Griffin et al. | |
| 10,469,574 B1 | 11/2019 | Dai et al. | |
| 10,841,152 B1 * | 11/2020 | Humphreys | H04L 67/10 |
| 10,873,592 B1 * | 12/2020 | Singh | G06F 9/45558 |
| 10,922,090 B1 * | 2/2021 | Lieberman | G06F 9/455 |
| 11,573,816 B1 * | 2/2023 | Featonby | H04L 67/10 |
| 2014/0047341 A1 | 2/2014 | Breternitz et al. | |
| 2017/0098092 A1 * | 4/2017 | Nachenberg | G06F 21/53 |
| 2017/0109372 A1 | 4/2017 | Shimamoto | |
| 2017/0153930 A1 * | 6/2017 | Philips | G06F 9/45558 |
| 2017/0180346 A1 * | 6/2017 | Suarez | G06F 21/53 |
| 2017/0250853 A1 * | 8/2017 | Evans | H04L 63/0281 |
| 2017/0318048 A1 * | 11/2017 | Htay | H04L 63/1433 |

(Continued)

FOREIGN PATENT DOCUMENTS

EP    3977274 A1    4/2022

OTHER PUBLICATIONS

Rupprecht et al., U.S. Appl. No. 17/093,369, filed Nov. 9, 2020.

(Continued)

*Primary Examiner* — Abu Zar Ghaffari
(74) *Attorney, Agent, or Firm* — Zilka-Kotab, P.C.

(57) ABSTRACT

A computer-implemented method according to one embodiment includes receiving a request to create a container; retrieving a manifest for a container image of the container; and mounting a file system for the container, utilizing the manifest.

23 Claims, 10 Drawing Sheets

(56) References Cited

U.S. PATENT DOCUMENTS

| | | | | |
|---|---|---|---|---|
| 2018/0004766 | A1* | 1/2018 | Darling | G06F 16/164 |
| 2018/0287883 | A1* | 10/2018 | Joshi | G06F 9/455 |
| 2019/0042759 | A1* | 2/2019 | Smith | G06F 21/74 |
| 2019/0050680 | A1* | 2/2019 | Waugh | H04L 67/1097 |
| 2019/0294461 | A1* | 9/2019 | Woods | G06F 16/14 |
| 2020/0218798 | A1* | 7/2020 | Kosaka | G06F 21/53 |
| 2020/0264776 | A1* | 8/2020 | Janse van Rensburg | G06F 3/0665 |
| 2020/0314167 | A1* | 10/2020 | Achyuth | G06F 21/6209 |
| 2021/0034537 | A1* | 2/2021 | Shuster | G06F 9/45558 |
| 2021/0042108 | A1* | 2/2021 | Suarez | G06F 8/63 |
| 2021/0373878 | A1* | 12/2021 | Padmanabhan | G06F 16/958 |
| 2022/0107902 | A1* | 4/2022 | Mayo | G06F 12/121 |
| 2022/0121466 | A1* | 4/2022 | Gasperowicz | H04L 9/50 |
| 2022/0197689 | A1* | 6/2022 | Hotinger | G06F 8/63 |
| 2023/0025529 | A1* | 1/2023 | Fu | G06F 9/4406 |
| 2023/0101628 | A1* | 3/2023 | Wise | H04L 67/10 717/175 |

OTHER PUBLICATIONS

Civolani et al., "FogDocker: Start Container Now, Fetch Image Later," Proceedings of the 12th IEEE/ACM International Conference on Utility and Cloud Computing, Dec. 2019, 12 pages.

Civolani et al., "Fast Docker container deployment in Fog computing infrastructures," Thesis, Universita Di Bologna, Academic year 2017/2018, 101 pages, retrieved from https://amslaurea.unibo.it/17701/1/tesi-civolani.pdf.

Littley, M., "Towards a Scalable Docker Registry," Thesis, Virginia Polytechnic Institute and State University, May 3, 2018, 75 pages.

Belitz, P., "Container Image Signatures in Kubernetes," SSE Blog, Aug. 7, 2020, 11 pages, retrieved from https://medium.com/sse-blog/container-image-signatures-in-kubernetes-19264ac5d8ce.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Docker Docs, "About storage drivers," docker docs, 2020, 10 pages, retrieved from https://docs.docker.com/storage/storagedriver/.

Brown, N., "Overlay Filesystem," kernel.org, 2020, 8 pages, retrieved from https://www.kernel.org/doc/Documentation/filesystems/overlayfs.txt.

Harter et al., "Slacker: Fast Distribution with Lazy Docker Containers," Proceedings of the 14th USENIX Conference on File and Storage Technologies (FAST '16), Feb. 2016, pp. 181-195.

Li et al., "DADI: Block-Level Image Service for Agile and Elastic Application Deployment," Proceedings of the 2020 USENIX Annual Technical Conference, Jul. 2020, pp. 727-740.

Zheng et al., Wharf: Sharing Docker Images in a Distributed File System, SoCC'18, Oct. 2018, 12 pages.

Zhao et al., "DupHunter: Flexible High-Performance Deduplication for Docker Registries," Proceedings of the 2020 USENIX Annual Technical Conference, Jul. 2020, pp. 769-783.

Zhao et al., "Large-Scale Analysis of the Docker Hub Dataset," IEEE International Conference on Cluster Computing (CLUSTER), 2019, 10 pages.

Reddit, "How long is your docker build?" reddit, 2020, 8 pages, retrieved from https://www.reddit.com/r/docker/comments/4db2ra/how_long_is_your_docker_build/.

Docker Docs, "Best practices for writing Dockerfiles," docker docs, 2020, 15 pages, retrieved from https://docs.docker.com/develop/develop-images/dockerfile_best-practices/#leverage-build-cache.

Docker Docs, "Best practices for writing Dockerfiles," docker docs, 2020, 15 pages, retrieved from https://docs.docker.com/develop/develop-images/dockerfile_best-practices/#use-multi-stage-builds.

Miller et al., "RPM Packaging Guide," RPM, 2020, 80 pages, retrieved from https://rpm-packaging-guide.github.io/#working-with-spec-files.

RPM, "Maximum RPM: Taking the RPM Package Manager to the Limit," RPM, Appendix A. Format of the RPM File, 2020, 12 pages, retrieved on Nov. 2, 2020, from http://ftp.rpm.org/max-rpm/s1-rpm-file-format-rpm-file-format.html.

Kangjin, et al., "FID: A Faster Image Distribution System for Docker Platform," IEEE 2nd International Workshops on Foundations and Applications of Self Systems, 2017, pp. 191-198.

Combined Search and Examination Report from European Application No. GB2115004.0, dated Oct. 3, 2022.

Response to Examination Report from European Application No. GB2115004.0, dated Apr. 3, 2023.

1 Examination Report from European Application No. GB2115004.0, dated Aug. 18, 2023, 6 pages.

Response to Examination Report from European Application No. GB2115004.0, dated Oct. 18, 2023.

* cited by examiner

… (1)

CONTAINER IMAGE CREATION AND DEPLOYMENT USING A MANIFEST

BACKGROUND

The present invention relates to hardware virtualization, and more particularly, this invention relates to creating and deploying container images.

Modern application deployment often relies on the use of containers. For example, container images are distributed via a central registry, and to start a container, a host pulls a container image and creates a root file system for the container, using the container image. The number of container images as well as the velocity of container deployments are rapidly increasing.

However, there are several issues with current implementations of container images. For example, containers are currently slow and I/O-intensive to start, as they require downloading and storing of large container images that results in a high utilization of local memory and/or storage. Transferring the large container images over communication networks also results in a high network utilization, as well as a high load on a registry service storage subsystem. As a result, current container images are bulky and expensive to transfer and store.

There is therefore a need for a faster and more efficient way to store and distribute container images.

BRIEF SUMMARY

A computer-implemented method according to one embodiment includes receiving a request to create a container; retrieving a manifest for a container image of the container; and mounting a file system for the container, utilizing the manifest.

According to another embodiment, a computer program product for deploying a container image includes a computer readable storage medium having program instructions embodied therewith, where the computer readable storage medium is not a transitory signal per se, and where the program instructions are executable by a processor to cause the processor to perform a method including receiving, by the processor, a request to create a container; retrieving, by the processor, a manifest for a container image of the container; and mounting, by the processor, a file system for the container, utilizing the manifest.

According to another embodiment, a system includes a processor; and logic integrated with the processor, executable by the processor, or integrated with and executable by the processor, where the logic is configured to receive a request to create a container; retrieve a manifest for a container image of the container; and mount a file system for the container, utilizing the manifest.

According to another embodiment, a computer-implemented method includes receiving a command to install a software package in a running container; retrieving a metadata package for the software package; installing the software package in the running container, utilizing the metadata package; identifying a need for a file during the installation of the software package; and retrieving the file, utilizing the metadata package.

According to another embodiment, a computer program product for creating a container image includes a computer readable storage medium having program instructions embodied therewith, where the computer readable storage medium is not a transitory signal per se, and where the program instructions are executable by a processor to cause the processor to perform a method including receiving, by the processor, a command to install a software package in a running container; retrieving, by the processor, a metadata package for the software package; installing, by the processor, the software package in the running container, utilizing the metadata package; identifying, by the processor, a need for a file during the installation of the software package; and retrieving the file by the processor, utilizing the metadata package.

Other aspects and embodiments of the present invention will become apparent from the following detailed description, which, when taken in conjunction with the drawings, illustrate by way of example the principles of the invention.

DETAILED DESCRIPTION

Figure 1:
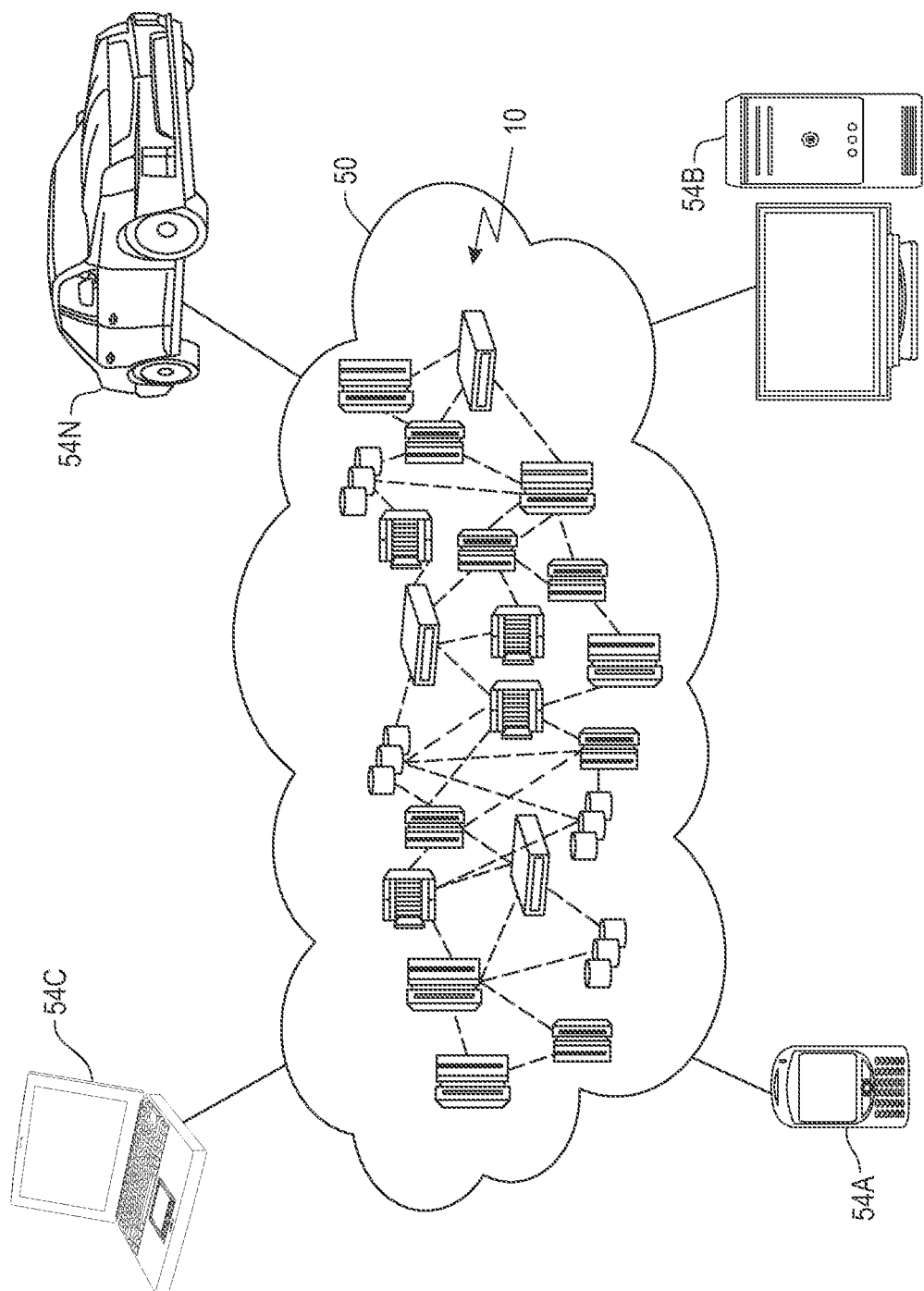
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of creating and deploying a container image.

In one general embodiment, a computer-implemented method includes receiving a request to create a container; retrieving a manifest for a container image of the container; and mounting a file system for the container, utilizing the manifest.

In another general embodiment, a computer program product for deploying a container image includes a computer readable storage medium having program instructions embodied therewith, where the computer readable storage medium is not a transitory signal per se, and where the program instructions are executable by a processor to cause the processor to perform a method including receiving, by the processor, a request to create a container; retrieving, by the processor, a manifest for a container image of the container; and mounting, by the processor, a file system for the container, utilizing the manifest.

In another general embodiment, a system includes a processor; and logic integrated with the processor, executable by the processor, or integrated with and executable by the processor, where the logic is configured to receive a request to create a container; retrieve a manifest for a container image of the container; and mount a file system for the container, utilizing the manifest.

In another general embodiment, a computer-implemented method includes receiving a command to install a software package in a running container; retrieving a metadata package for the software package; installing the software package in the running container, utilizing the metadata package; identifying a need for a file during the installation of the software package; and retrieving the file, utilizing the metadata package.

In another general embodiment, a computer program product for creating a container image includes a computer readable storage medium having program instructions embodied therewith, where the computer readable storage medium is not a transitory signal per se, and where the program instructions are executable by a processor to cause the processor to perform a method including receiving, by the processor, a command to install a software package in a running container; retrieving, by the processor, a metadata package for the software package; installing, by the processor, the software package in the running container, utilizing the metadata package; identifying, by the processor, a need for a file during the installation of the software package; and retrieving the file by the processor, utilizing the metadata package.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
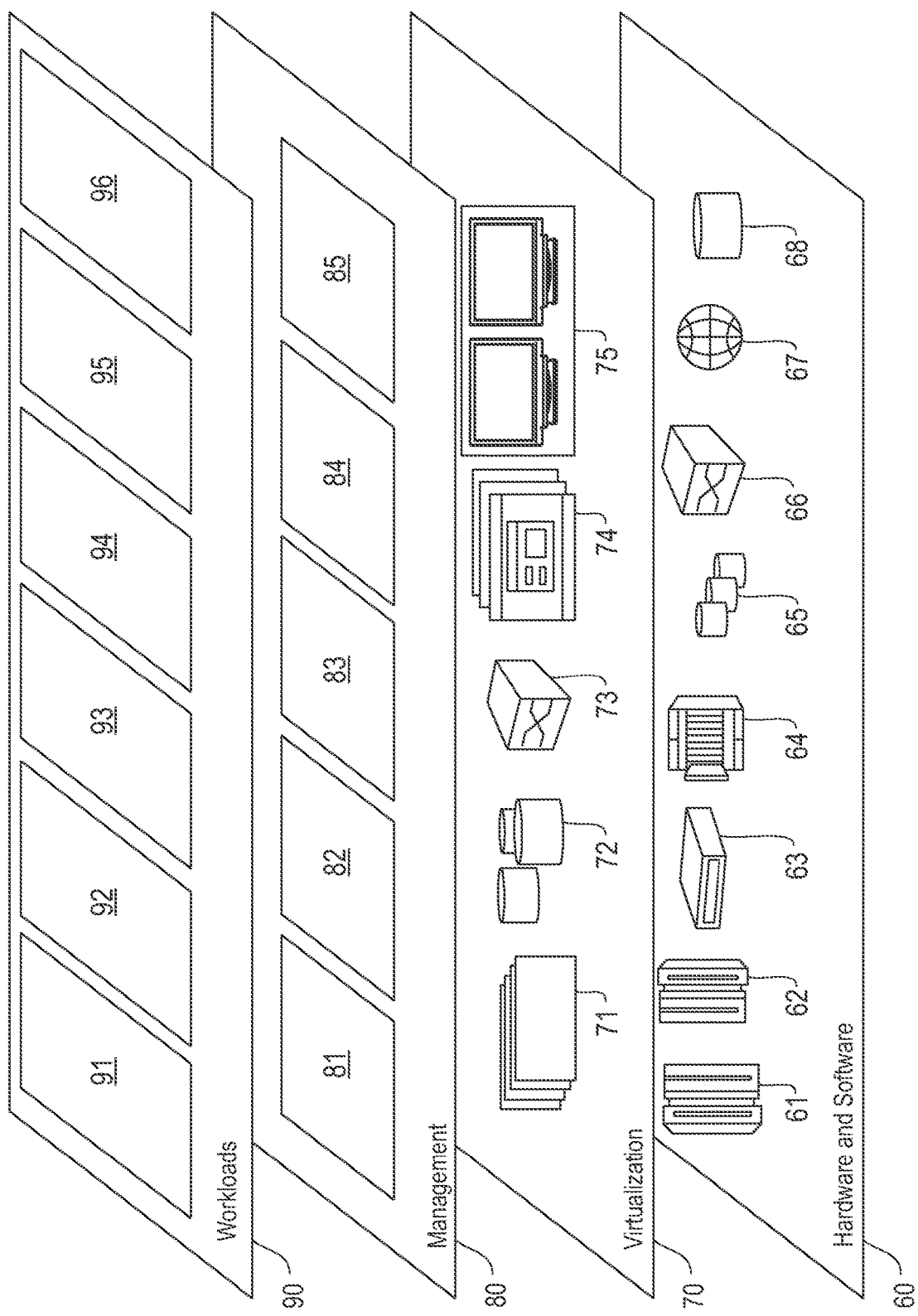
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image creation and deployment 96.

Figure 3:
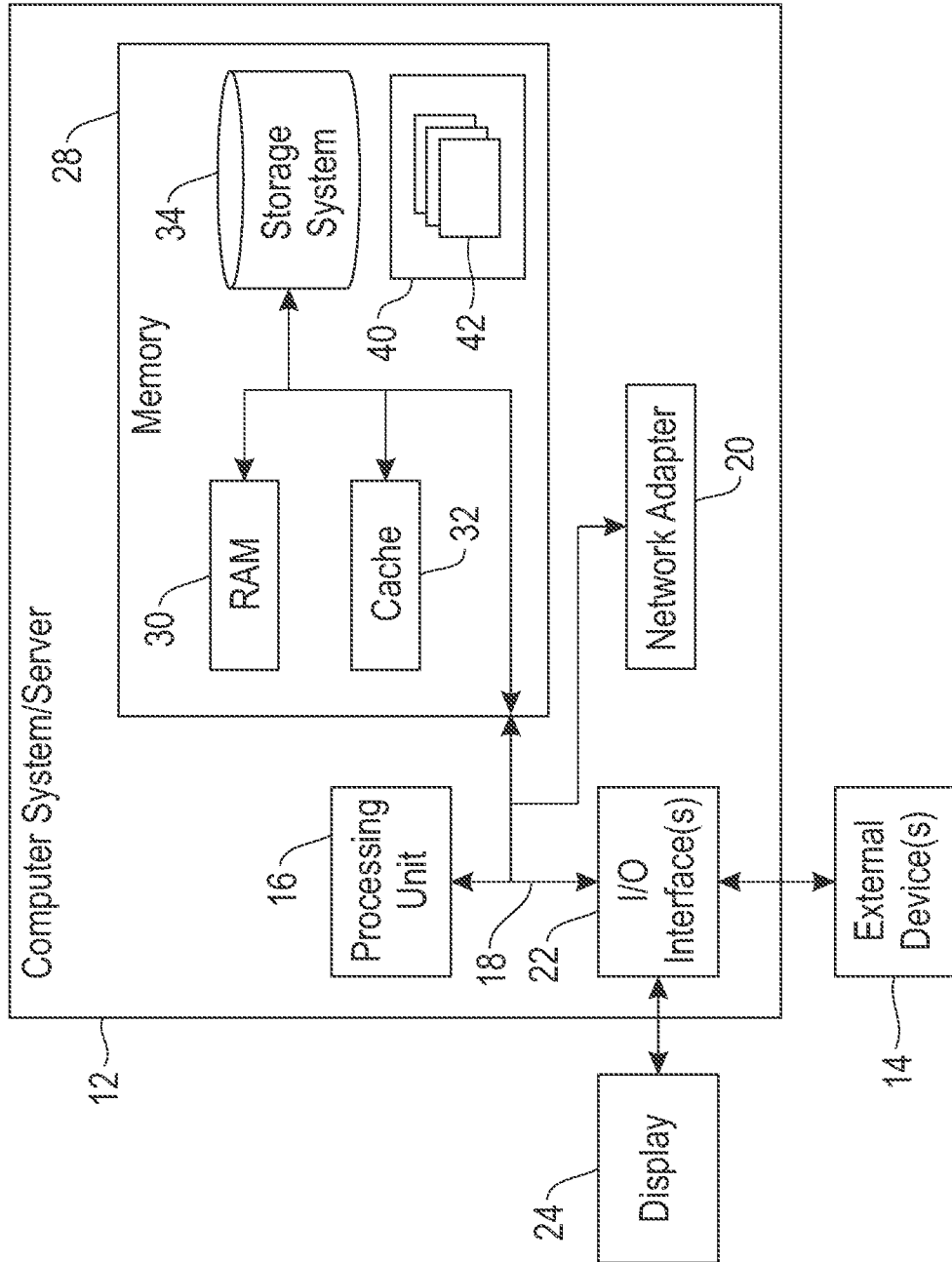
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
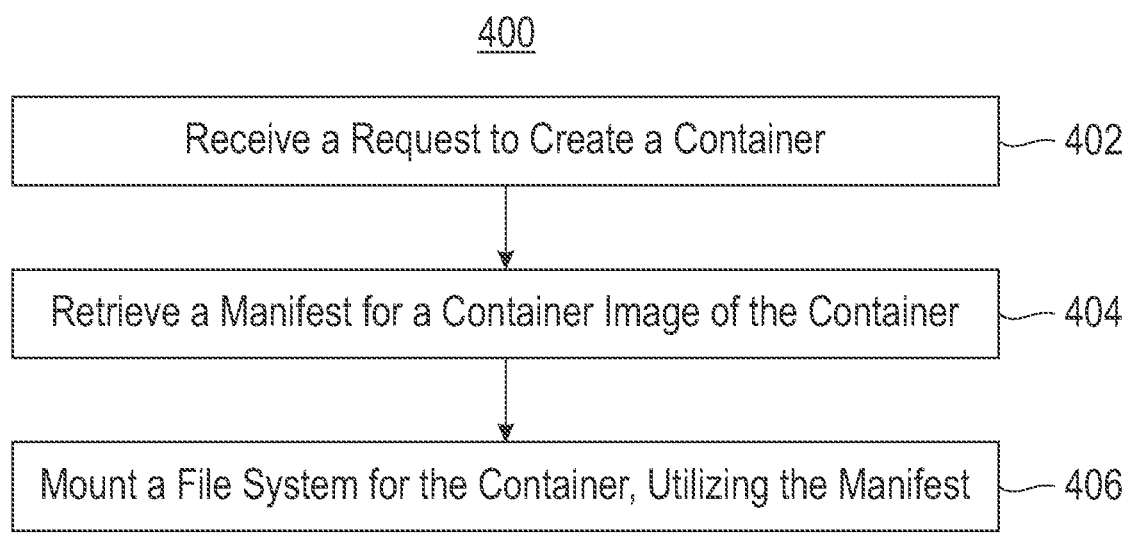
FIG. 4 illustrates a flowchart of a method for deploying a container image, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 7-10, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request to create a container is received. In one embodiment, the request may be received from a user. In another embodiment, the request may be received at a cluster of computing nodes (e.g., a distributed computing network, a cloud-based computing environment, etc.).

Additionally, in one embodiment, the container may be implemented using an operating system (OS)-level virtualization and may rely on a self-contained software package (e.g., an image). In another embodiment, creating the container may include mounting a file system for the container at one of the plurality of computing nodes within the cluster, loading one or more files (containing, e.g., executables, libraries, data, etc.) within the container and/or running one or more applications within the container, utilizing the mounted file system, etc.

Further, method 400 may proceed with operation 404, where a manifest for a container image of the container is retrieved. In one embodiment, the container image may include all files needed to create the container at one of the cluster of computing nodes. For example, the container image may include a plurality of files (e.g., an executable package including code, runtime, system tools, system libraries and settings, etc.).

Further still, in one embodiment, the manifest for the container image may include metadata describing the plurality of files within the container image. For example, the manifest may include a list of file names (e.g., content identifiers), ownership and/or permissions data associated with those files, etc. In another example, the manifest may include content-based addresses for the files (e.g., file hashes, pointers to locations where the plurality of files are stored, etc.). In yet another example, the manifest may store a plurality of file stubs that each include a pointer to a location where the file is stored.

Also, in one embodiment, the manifest may include metadata describing the plurality of files within the container image, but not the plurality of files themselves. In another embodiment, the files may be stored remotely at a content store (e.g., a centralized object storage). In yet another embodiment, one or more of the files may be stored locally (e.g., at a node where the container has been created, etc.).

In addition, in one embodiment, the manifest may be retrieved from a repository. For example, a node within a cluster may be assigned the task of creating the container, and may retrieve the manifest for the container image of the container from a manifest repository (e.g., a database, etc.) that is physically separate from the node.

Furthermore, in one embodiment, the manifest may be retrieved locally from a node where the container is being created. For example, the node assigned the task of creating the container may search for the manifest in its cached data, and if the manifest is found in the cache, the cached manifest may be retrieved from the cache. In another example, if the manifest is not found in the cache, the manifest may be retrieved from a repository located separately from the node.

Further still, method 400 may proceed with operation 406, where a file system for the container is mounted, utilizing the manifest. In one embodiment, the manifest may include sufficient data to create (e.g., mount) a file system for the container. In another embodiment, the manifest may include one or more inode descriptors and file hashes. In still another embodiment, the inode descriptors may include metadata used to mount the file system for the container. In another embodiment, the file system may be mounted at a node of the cluster of computing nodes (e.g., the node assigned the task of creating the container, etc.).

In this way, a file system for a container may be mounted utilizing a manifest for a container image, instead of the complete container image itself. The manifest may only include metadata needed to mount the file system, as well as pointers to additional file data included within the container image. As a result, the manifest may be much smaller in size than the container image itself. By retrieving the manifest instead of the image in order to mount the file system for a container, a node may use significantly less bandwidth, which may improve a performance of computing hardware used by the node, as well as a performance of hardware components used to implement a communications network that facilitates the transmission of data between the node and data stores such as the manifest repository, a container image repository, etc.

Figure 5:
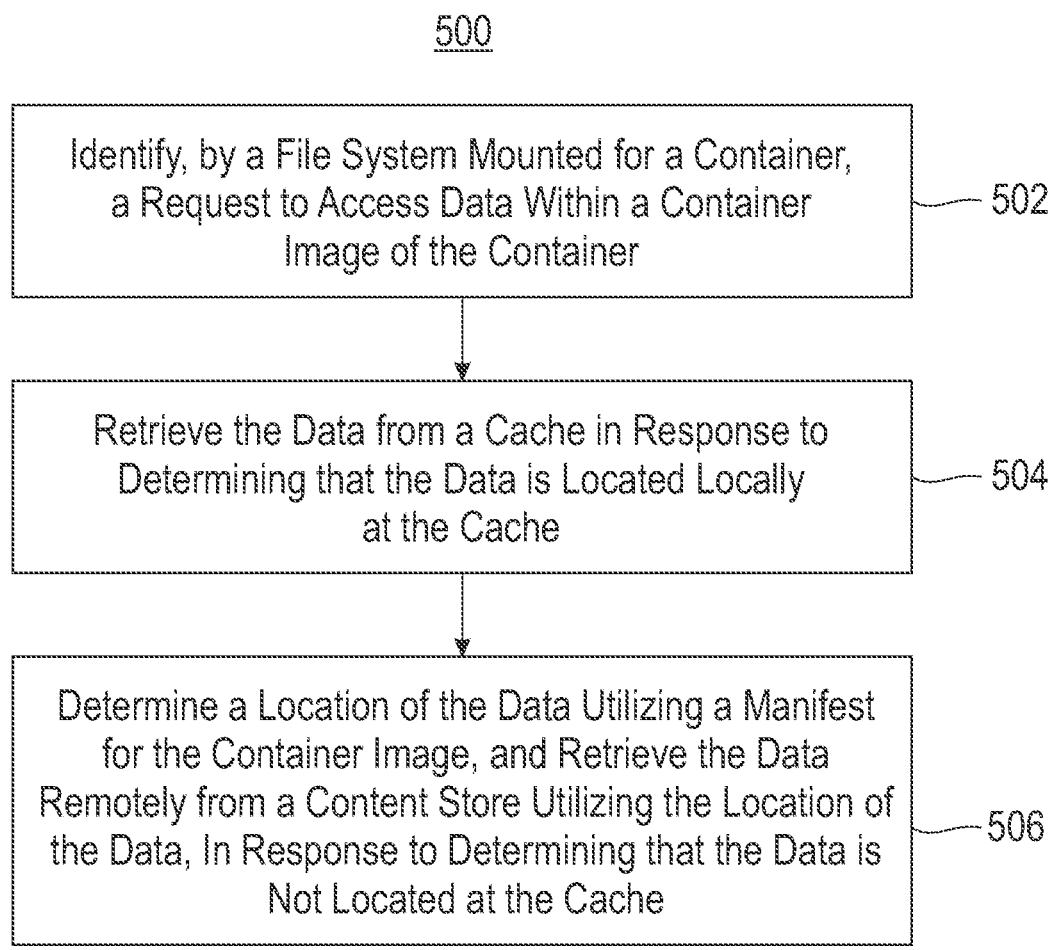
FIG. 5 illustrates a flowchart of a method for performing on-demand container image file access, in accordance with one embodiment of the present invention.

Now referring to FIG. 5, a flowchart of a method 500 for performing on-demand container image file access is shown according to one embodiment. The method 500 may be performed in accordance with the present invention in any of the environments depicted in FIGS. 1-3 and 7-10, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to access data within a container image of the container is identified by a file system mounted for a container. In one embodiment, the request to access data may include a file read request. In another embodiment, the request to access data may include a request from an application within the container to read data within the container image.

Additionally, in one embodiment, the file system may be mounted for the container at a node of a cluster of computing nodes. In another embodiment, the file system may be mounted for the container in response to a request to create the container.

Further, method 500 may proceed with operation 504, where the data is retrieved from a cache in response to determining that the data is located locally at the cache. For example, the cache may include a high speed, low latency memory that is faster than standard data storage within a node of a cluster. In another example, the cache may include volatile memory.

Further still, method 500 may proceed with operation 506, where a location of the data is determined utilizing a manifest for the container image, and the data is retrieved remotely from a content store utilizing the location of the data, in response to determining that the data is not located at the cache. In one embodiment, the location of the data may be included within metadata stored within the manifest. For example, the metadata may describe the plurality of files within the container image. In another embodiment, the manifest may include content-based addresses for the files (e.g., file hashes, pointers to locations where the plurality of files are stored, etc.). In another embodiment, the content store may be physically separate from the node of the cluster, and may be accessed via a communications network.

Also, in one embodiment, file system may be mounted at a predetermined node of a cluster. In another embodiment, in response to determining that the manifest for the image indicates that the data is stored locally at the cache, the data may be retrieved from the cache. In yet another embodiment, in response to determining that the manifest for the image indicates that the data is not stored locally at the cache, the data may be retrieved from the content store, utilizing the communications network. For example, the content store may store the data in association with the container image.

In addition, in one embodiment, the retrieved data may be used by the mounted file system. For example, the retrieved data may be presented to an application running within the node, utilizing the mounted file system.

In this way, a manifest for the container image may enable the mounted file system for a container to obtain data within the container image on-demand, without having to store the container image locally on a node where the file system is mounted. This may reduce an amount of data needed to implement a container on a node, which may improve a performance of the node. This may also reduce an amount of data needed to be transferred to the node in order to implement the container on the node, which may reduce an amount of network traffic between the node and a container image store, thereby improving a performance of one or more hardware components implementing such network communications.

Figure 6:
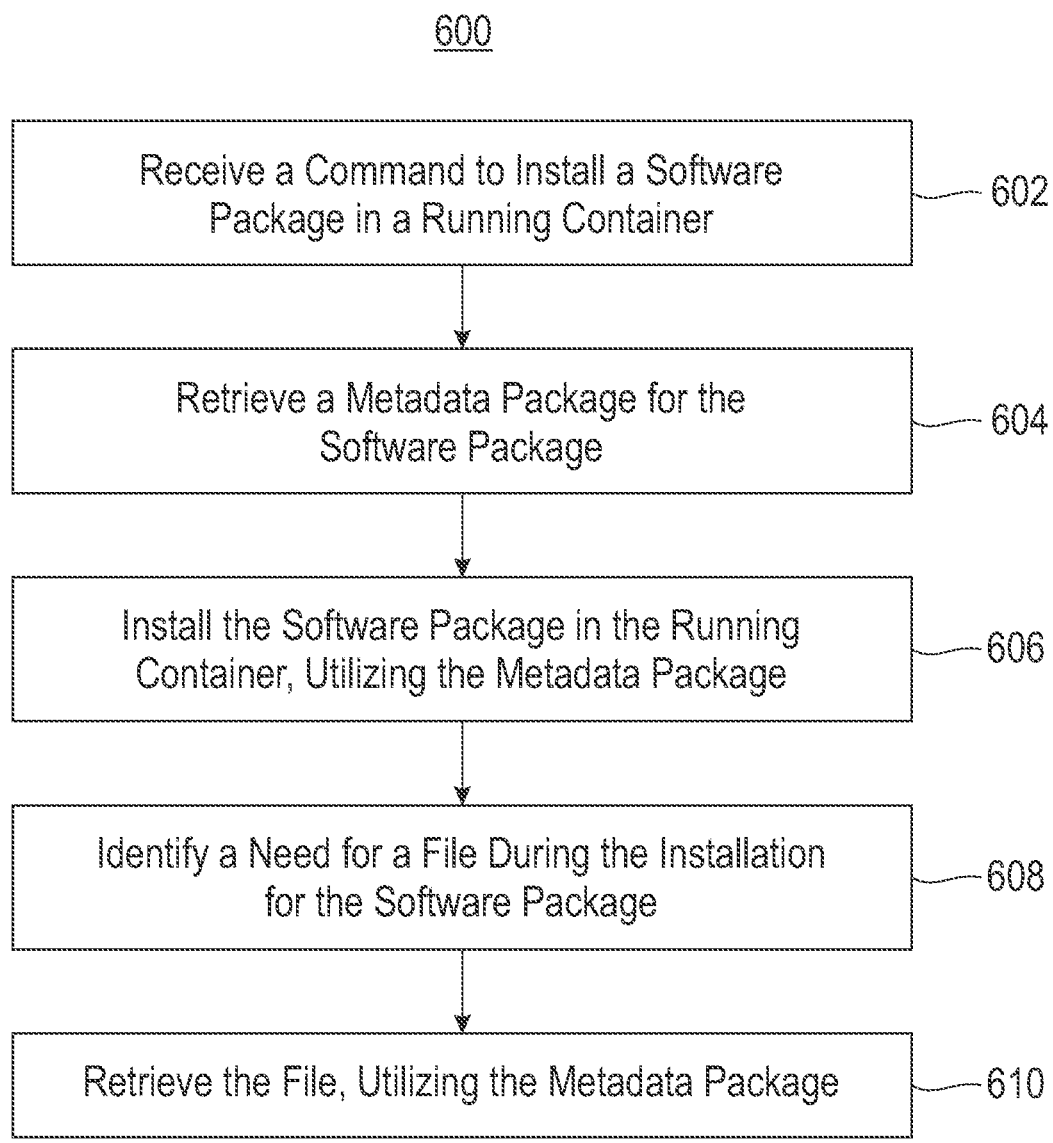
FIG. 6 illustrates a flowchart of a method for installing a package in a running container using a metadata package, in accordance with one embodiment of the present invention.

Now referring to FIG. 6, a flowchart of a method 600 for installing a package in a running container using a metadata package is shown according to one embodiment. The method 600 may be performed in accordance with the present invention in any of the environments depicted in FIGS. 1-3 and 7-10, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a command is received to install a software package in a running container. In one embodiment, the command may be received from a user, an application, etc. In another embodiment, the command may be received at a cluster of computing nodes (e.g., a distributed computing network, a cloud-based computing environment, etc.).

Additionally, in one embodiment, the software package may include all files needed to add the software package to the running container at one of the cluster of computing nodes. In another embodiment, the running container may include a container that has been installed at a node utilizing a container image. For example, a node of a cluster may be assigned to create the container image.

Further, method 600 may initiate with operation 604, where a metadata package for the software package is retrieved. In one embodiment, the metadata package may be retrieved from a public repository (e.g., a database such as a public package metadata store, etc.). For example, the public package metadata store may be physically separate from a public package data store that stores files pointed to by the metadata package.

Further still, in one embodiment, the metadata may include a list of files and a hash of the content of the files. In another embodiment, the metadata may include a location of each of the files, and not the files themselves.

Also, in one embodiment, the node may first check a local cache of the node to see if the metadata package is located within the cache. For example, if the metadata package is determined to be located within the cache, the metadata package may be retrieved from the cache. In another example, if the metadata package is not determined to be located within the cache, the metadata package may be retrieved from a public repository separate from the cache and node.

In addition, method 600 may proceed with operation 606, where the software package is installed in the running container, utilizing the metadata package. In one embodiment, installing the software package may include installing the metadata within the metadata package at a node of the cluster (e.g., the assigned node, etc.).

Furthermore, in one embodiment, the metadata may be installed within the node as one or more stub files having pointers to data. For example, each of the stub files may represent a file within the container image. In another example, each of the stub files may not be the file itself, but a metadata placeholder for the file. In yet another example, each of the stub files may point to a location where the file is stored (e.g., at a separate file repository, at a cache, etc.).

Further still, in one embodiment, the hash of the content of the files within the metadata may be used as the pointers within the software package.

Also, method 600 may proceed with operation 608, where a need for a file is identified during the installation of the software package. In one embodiment, a request for a specific file within the software package may be received during the installation of the software package. For example, request may be received from a compiler that is installing the software package. In another embodiment, the installation of the software package may require a file that is not present within the metadata package.

Additionally, method 600 may proceed with operation 610, where the file is retrieved utilizing the metadata package. In one embodiment, in response to identifying the need for the file, a local cache of the node where the container image is being created may be searched to see if the file is located within the cache. In another embodiment, if the file is located at the cache, it may be retrieved from the cache. In yet another embodiment, if the file is not located at the cache, it may be retrieved from a file repository (e.g., a public repository separate from the cache and node).

Further, in one embodiment, the metadata placeholder for the file (e.g., the stub for the file), may be identified at the node. In another embodiment, a pointer to the location of the file may be associated with the metadata placeholder. In yet another embodiment, the pointer may be used to determine the location of the file and retrieve the file. In still another embodiment, the file may be retrieved and may be used to continue and/or complete the installation of the software package.

In this way, the metadata package may contain only file metadata without the actual files contained within a container image. As a result, installing the metadata package may only require copying the metadata and associated pointers, without having to copy the data itself. Data needed during the installation of the software package may be retrieved on-demand as necessary. This may reduce an amount of storage necessary to install the software package, which may improve a performance of a hardware computing device implementing the installation of the software package. This may also help create an image in an expedited and efficient manner. This may also reduce an amount of bandwidth necessary to install the software package, thereby improving a performance of one or more hardware components implementing one or more network communications used during the installation of the software package.

Efficient Runtime Image Distribution, Deployment, and Operation

Image distribution has a few consistent characteristics. For example, there is a high level of duplication of distributed images, and a small percentage of image data is actually used by a container. These insights may be leveraged to improve image distribution and deployment.

In one embodiment, each image may be represented by a small manifest that lists file names and metadata. Additionally, the manifest alone is self-sufficient to create (e.g., mount) a file system on worker nodes and support read-only metadata operations, without fetching any file data.

Additionally, in one embodiment, for each containing file, manifest stores a content-based address of file's data. The file content itself is stored in, e.g., an object storage. Only the data that is actually accessed by a host is transferred to the host in an on-demand fashion. The local memory and storage of a node implementing the image do not keep duplicate files and the registry does not contain duplicates.

In one embodiment, a method is provided to store and distribute images. Additionally, a method is provided for starting containers using file system metadata only. Further, a method is provided for downloading container data on demand. Further still, a method is provided for avoiding duplicates when transferring images using content-addressable storage.

Also, a method is provided for managing a host-side image cache. In addition, a method is provided for the transparent conversion of traditional images into content-addressable images.

Figure 7:
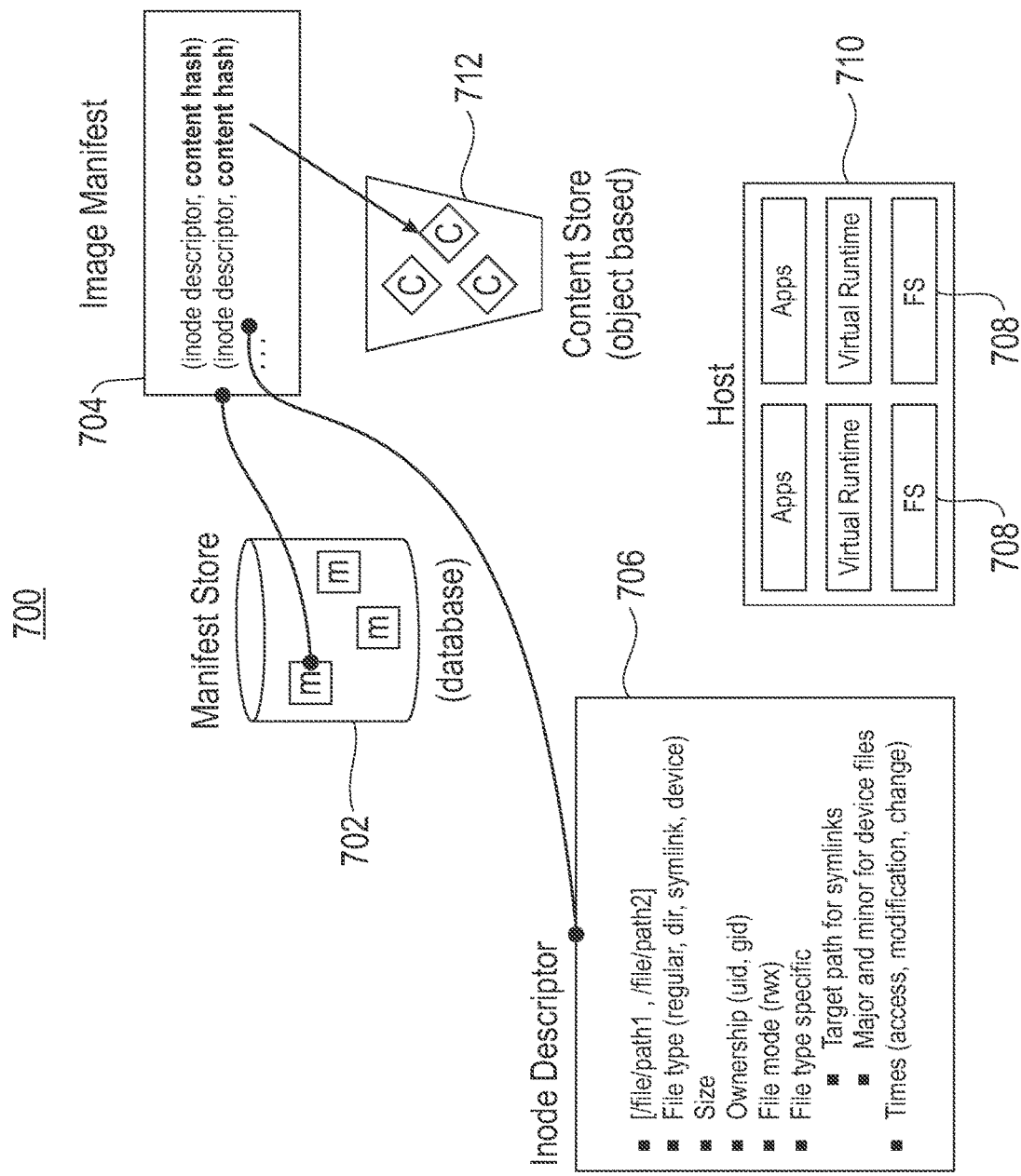
FIG. 7 illustrates exemplary image distribution system components, in accordance with one embodiment of the present invention.

FIG. 7 illustrates exemplary image distribution system components 700, according to one exemplary embodiment. As shown, a manifest store 702 stores a plurality of image manifests 704. Each of the image manifests 704 includes one or more inode descriptors 706. The image manifests 704 are used to mount file systems 708 within a designated host 710. If files within a container image are desired, an inode descriptor 706 is identified within an image manifest 704 for the container image and is used to retrieve the files from a content store 712.

Figure 8:
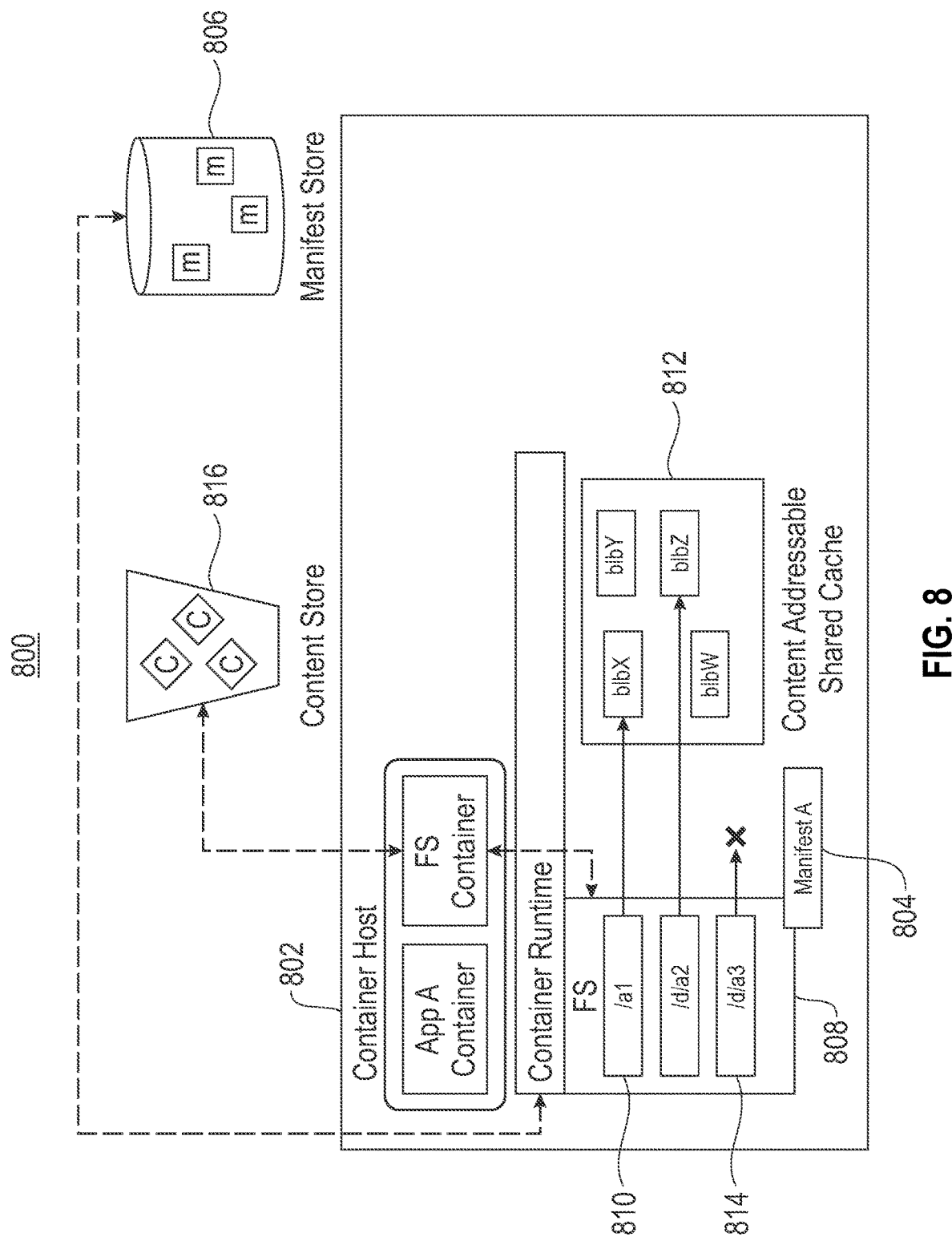
FIG. 8 illustrates an exemplary image distribution system implementation, in accordance with one embodiment of the present invention.

FIG. 8 illustrates an exemplary image distribution system implementation 800, according to one exemplary embodiment. As shown, in response to a request to create a container at a host 802, a manifest 804 for a container image for the container is retrieved from a manifest store 806. This manifest 804 is used to mount a file system 808 within the container host 802.

In response to a request for a first file within the mounted file system 808, a stub for the first file 810 within the file system 808 may point to a shared cache 812, where the file is retrieved. In response to a request for a second file within the mounted file system 808, a stub for the second file 814 within the file system 808 does not point to the shared cache 812. As a result, a content-based address for the second file is identified within the manifest 804 and is used to retrieve the second file from a content store 816.

Exemplary Container Startup and File Operation

In one embodiment, during a startup, a user requests to start a container from an image A. If a manifest for image A is locally present, a file system is mounted for the container using the manifest. If the manifest is not locally present, it is retrieved from a manifest store, and the file system is mounted for the container using the manifest. After the file system is mounted, operations such as open, stat, readdir, etc. may be performed completely locally (e.g., local to the node with the started container, etc.).

In another embodiment, an application requests to read data from file F. In response, using file F's content hash in the manifest, it is determined whether the file F is available locally (e.g., within a cache of the node, etc.). If file F is available locally, the requested data is returned to the application. If file F is not available locally, the missing file content is fetched from the content store, and the requested data is returned to the application.

In yet another embodiment, an application requests to write data to file F. if the write is a complete overwrite, the copy is updated with application-provided data. In another embodiment, updates do not go to the content store, unless explicitly requested. In another embodiment, root file system changes are lost when a container stops. An acknowledgement of the write is then sent to the application.

If the write is not a complete overwrite, using file F's content hash in the manifest, it is determined whether the file contents are available locally. If they are, a copy of F's content is created, the copy is updated with application-provided data, and an acknowledgement of the write is sent to the application. If the contents are not available locally, missing file content is fetched from the content store, a copy of F's content is created, the copy is updated with application-provided data, and an acknowledgement of the write is sent to the application.

In still another embodiment, metadata updates (e.g., create, delete, rename, directory operations, setattr, etc.) do not require communication with content or manifest store.

Content Addressable Shared Cache Management

In one embodiment, a cache resides in volatile memory. Common diskless setups may be supported, and optional support may exist for a local storage cache. A memory cache size is fixed at a container runtime start, and a container orchestrator (K8s) accounts for memory used for cache when scheduling containers.

Further, a tiered memory cache eviction order may exist, as follows:

T1: Blobs not referenced by any locally pulled manifests (image was deleted)
T2: Blobs not referenced by any "running" images (but referenced by local manifests)
T3: Non-modified blobs not referenced by any open files (but ref. by running images)
T4: Other non-modified blobs Reference tracking and garbage collection techniques may also be used. An LRU or ARC eviction policy may be used within the tier. To handle cache threshing or out of space situations, I/O may be blocked, or an error with ENOSPC may be provided. Prefetching of frequently used files in an image may also be performed (e.g., utilizing a manifest extension, etc.).

Compatibility with Existing Registries

It may be possible to use standard images using other graph drivers (e.g., overlay, dm, etc.). An Image Conversion Service (ICS) may download images from traditional registries, unpack tarballs, upload missing files to a content store as blobs, generate manifests, and upload them to a manifest store.

The ICS may be either converged with regular worker nodes or run on a dedicated set of nodes. In a converged setup, worker nodes may receive regular images, convert them to images, and immediately start containers using the file system. Uploading of missing content and manifests to appropriate stores may be performed asynchronously.

Fast Container Image Builds through Metadata Software Packages

Container image builds consist of several steps:
Retrieving a base image
Installing additional software in image from remote repos
Copying local software and data into an image
Extracting/building/generating additional image artifacts This build process can take a long time due to heavy I/O (network and storage) needs as lots of data needs to be copied/retrieved. A large portion of time is spent in package retrieval and installation (yum, apt, etc.). Additionally, overhead increases if the image is built repeatedly (e.g. during CI/CD pipeline or image testing). This problem exists for any OCI-compliant image.

As a result, a faster way for building container images is needed.

In one embodiment, a method is provided to install and manage software packages (e.g., RPM, DEB, etc.), where the method includes maintaining a package repository that consists of a public package data store, a public package metadata store, and a private data store; installing a software package and downloading from the public metadata store only the package metadata which includes the list of packaged files and their content hash; installing the metadata in the file system as stub files with pointers to the data via their content hash; and retrieving the data asynchronously or on-demand from the public data store into the private data store if the same content is not already present in the private data store.

In another embodiment, a method is provided to create and share metadata packages, including traversing the files listed in the package specification file or in the existing package, computing content IDs for each file, and adding the IDs to the package metadata; and uploading the new package metadata to the public metadata store while uploading the files to the public data store only if their content is not already present at the public data store.

Additionally, in one embodiment, packages are collections of file metadata only without the actual content. Installing a package only requires copying the metadata, and retrieving metadata from a package repository is resource-efficient and fast. No storage or network I/O is needed during the package installation, and when and if package data is needed, the necessary data is retrieved using the file metadata.

Figure 9:
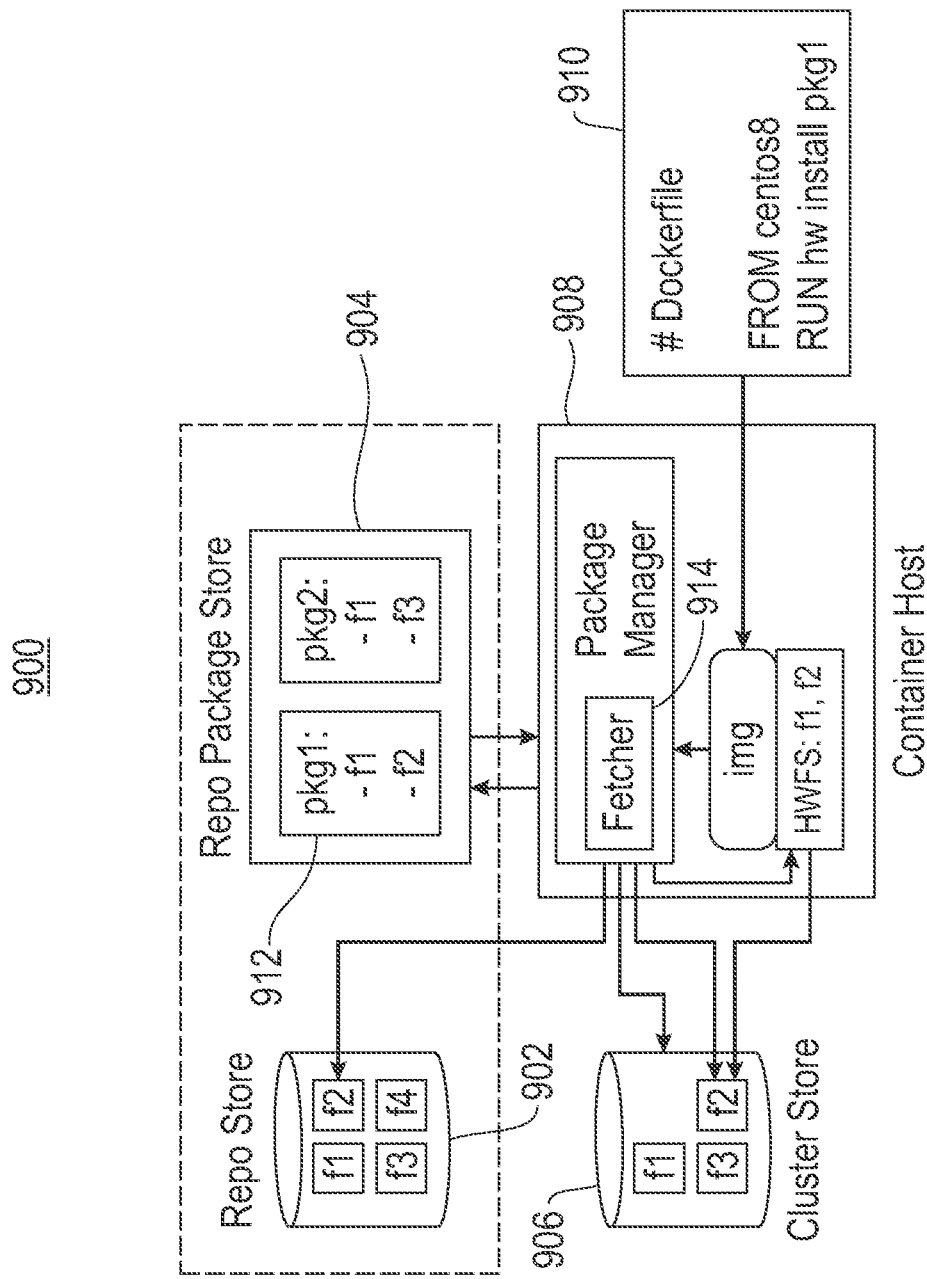
FIG. 9 illustrates an exemplary system architecture, in accordance with one embodiment of the present invention.

FIG. 9 illustrates an exemplary system architecture 900, according to one exemplary embodiment. As shown, a repo store 902 that stores package data is located separately from a repo package store 904 that stores metadata packages and a cluster store 906 that stores package data locally to be accessed by containers. A container host 908 receives instructions 910 to build an image using a first package. Metadata 912 for the first package is retrieved from the repo package store 904 to build the image.

Additionally, if a file is needed during the building of the image, the cluster store 906 is first checked. If the file exists at the cluster store 906, the file is retrieved from the cluster store 906 by the fetcher module 914 of the container host 908. It the file does not exist at the cluster store 906, the file is retrieved from the repo store 902 by the fetcher module 914 of the container host 908.

Figure 10:
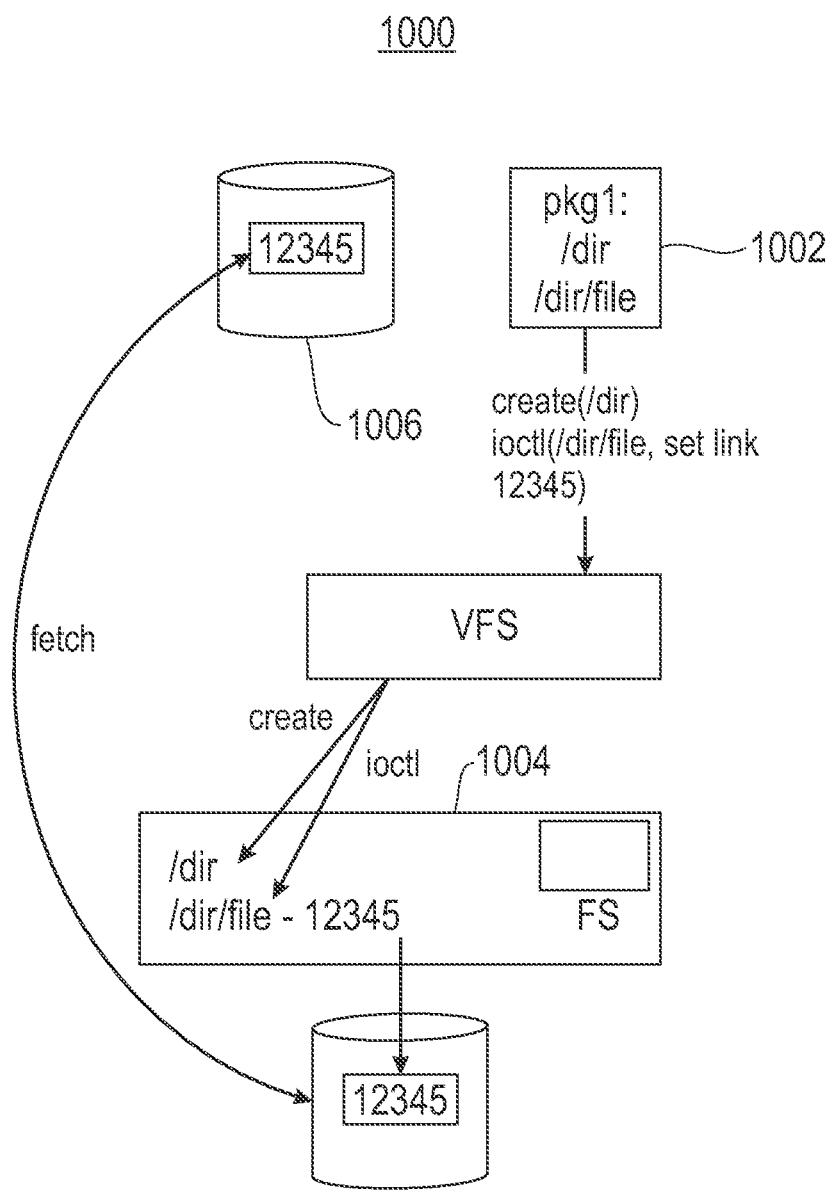
FIG. 10 illustrates an exemplary package installation, in accordance with one embodiment of the present invention.

FIG. 10 illustrates an exemplary package installation 1000, according to one exemplary embodiment. As shown, a metadata package 1002 is downloaded from a repository. Additionally, all directories 1004 listed in the metadata package 1002 are created (e.g., using a POSIX create). Further, for each regular file listed in the metadata package 1002, a file is created and its FILELINK is set through an ioctl system call. FILELINK is followed and content is retrieved if it does not yet exist in a content store 1006. In one embodiment, the ioctl system call may be applied to the entire list to create all content.

In one embodiment, existing (pre-/post-install) scriptlets can interact with the file system as usual, and if scriptlets require any files that have not been fetched yet, the package manager will wait until the necessary data has been retrieved.

Package Creation

In one embodiment, packages are based on RPM. A definition may be provided through a .spec file. This may be compatible with an existing .spec format. Package creation may be implemented through a new build-skinny-pkg tool tool. An example build-skinny-pkg tool is provided as follows:

example.spec [1]
- - -
Name: example
Version: 0.1.1
BuildRequires: python
Requires: bash
%build
python -m compileall %{name}.py
%install
mkdir -p %{buildroot}/usr/lib/%{name}
install -m 0644% {name}.py*% {buildroot}/usr/lib/% {name}/%
files
%dir/usr/lib/%{name}/
/usr/lib/%{name}/%{name}.py*

The above spec may create a. spkg package file. The tool build-skinny-pkg may execute the following steps:
1. Traverse %{buildroot}
2. For each file
   A. Compute hash
   B. Check if already exists in repo store
   C. If not, upload to repo store
   D. Add a metadata entry to header of .spkg file 3. Upload .spkg file to repo package store Package File Layout and Conversion Package files may be based on a .rpm format. They may include a header preamble, a header Index (with tags describing the different entries in the header store), and a header store. .spkg packages may not have a payload (e.g., they may be a data archive), and may include a new header tag (HWTAG_FILELINKS), which stores the hash for each file. The file link for directories and non-regular files may be set to '−1'.

In one embodiment, the conversion from .rpm to .spkg package consists of the following steps:
1. Copy preamble
2. Copy index and add new HWTAG_FILELINKS tag
3. Extract content from .rpm file
4. Iterate through file list and for each file
   A. Compute hash
   B. Upload to Repo Store
   C. Add hash to Header Store Prioritized Content Retrieval In one embodiment, a fetcher may retrieve content in parallel to not block image building. The fetcher can retrieve content in a prioritized order. Any package files needed during the image build may be fetched first. Prioritized retrieval order may be determined by the following steps:
1. Scan Dockerfile for calls to binaries (RUN commands)
2. Order found binaries according to their position in Dockerfile
3. For each found binary, scan current package for a match
4. If match is found, append binary to list of prioritized files
5. Retrieve prioritized binaries in order Packages may also specify a preferred retrieval order as part of the package metadata.

Switching Repositories

In one embodiment, transitioning from a standard repository to a metadata repository can be achieved through two different options. The first option is a new toolset that provides an entirely new repository and toolset and make the toolset compatible with an existing repository toolset (e.g. yum). Old toolset commands may be aliased to new toolset commands for a seamless transition.

A second option is to update an existing toolset by changing existing tools to allow for metadata package retrieval. An option to indicate whether a metadata software package should be retrieved may be added. Each repository definition may have two versions: one for traditional and one for metadata packages. If the metadata package option is set, metadata package repo may be used.

In one embodiment, a method is provided to store and serve metadata packages for installation in container images during image builds. Additionally, a method is provided to install metadata software packages in container images. Further, a method is provided to create metadata software packages, which is compatible with existing package creation tooling. Further still, a file layout for metadata software packages is provided.

Also, a method is provided to convert existing packages to metadata software packages. Further, a method is provided for prioritized retrieval of the content of a metadata software package.

In one embodiment, a method is provided for container root file system creation, operation, and interaction with a container image registry, the method including maintaining a per container image manifest that contains every file's path, metadata, and content hash while keeping the file's content in a registry's content-addressable store; during a container start, downloading from the image registry solely the image manifest, without image content, and mounting the file system with content hashes stored in inodes; on file data access, checking whether the file's content is locally present; if the content is missing, downloading it to the cache from the registry; keeping downloaded file content in a local content-addressable cache that is shared between all container root file system instances on the host; and when pushing an image to a registry, generating the manifest and uploading the image along with only missing content to the registry.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a request to create a container;
retrieving a manifest for a container image of the container;
creating the container, including mounting a file system for the container utilizing data from the manifest, wherein only the data from the manifest is used to create the file system for the container without fetching any file data;
after creation of the container, identifying, by the file system mounted for the container, a request to access data within the container image of the container;
determining, utilizing the manifest for the container image, whether the requested data is located locally in a cache;
retrieving the requested data from the cache in response to determining that the manifest for the container image indicates that the requested data is stored locally at the cache; and
retrieving the requested data from a content store in response to determining that the manifest for the container image indicates that the requested data is not available locally at the cache.

2. The computer-implemented method of claim 1, wherein:
the container image consists essentially of a plurality of files needed to create the container at a node of a cluster of computing nodes and metadata describing the plurality of files within the container image.

3. The computer-implemented method of claim 1, wherein the file system for the container is mounted on a node of a computing system, wherein the container image is not stored on the node where the file system is mounted.

4. The computer-implemented method of claim 1, wherein the manifest includes one or more inode descriptors and file hashes, wherein the inode descriptor is used to retrieve the requested data from the content store in response to determining that the manifest for the container image indicates that the requested data is not available locally at the cache.

5. A computer-implemented method of claim 1, comprising:
receiving a command to install a software package in the running container;
retrieving a metadata package for the software package;
installing the software package in the running container, utilizing the metadata package;
identifying a need for a file during the installation of the software package; and
retrieving the file, utilizing the metadata package.

6. A computer-implemented method, comprising:
receiving a request to create a container;
retrieving a manifest for a container image of the container, the manifest having file names and metadata;
mounting a file system for the container on a node of a computing system utilizing data from the manifest; and
creating the container,
wherein only the data from the manifest is used to create the file system for the container without fetching any file data,
wherein the container image is not stored on the node where the file system is mounted.

7. The computer-implemented method of claim 6, further comprising:
identifying, by the file system mounted for the container, a request to access data within the container image of the container;
determining a location of the data utilizing a manifest for the container image; and
retrieving the data, utilizing the location of the data.

8. The computer-implemented method of claim 7, wherein the request to access the data includes a request from an application within the container to read data within the container image.

9. The computer-implemented method of claim 7, wherein the location of the data is included within metadata stored within the manifest.

10. The computer-implemented method of claim 7, wherein the manifest includes content-based addresses for files.

11. The computer-implemented method of claim 7, further comprising retrieving the data from a cache in response to determining that the manifest for the container image indicates that the data is stored locally at the cache.

12. The computer-implemented method of claim 7, further comprising retrieving the data from a content store via a communications network in response to determining that the manifest for the container image indicates that the data is not stored locally at a cache.

13. The computer-implemented method of claim 6, comprising:
identifying, by the file system mounted for the container, a request from an application within the container to read data within the container image of the container;
determining a location of the data within the container image utilizing a manifest for the container image; and
retrieving the data from the container, utilizing the location of the data.

14. A computer program product for deploying a container image, the computer program product comprising a non-transitory computer readable storage medium having program instructions embodied therewith, the program instructions executable by a processor to cause the processor to perform a method comprising:
receiving, by the processor, a request to create a container;
retrieving, by the processor, a manifest for a container image of the container;
mounting, by the processor, a file system for the container utilizing data from the manifest, wherein only the data from the manifest is used to create the file system for the container without fetching any file data;
after creation of the container, identifying, by the processor, a request to access data within the container image of the container;
determining, utilizing a manifest for the container image, whether the requested data is located locally in a cache;
retrieving the requested data from the cache in response to determining that the manifest for the container image indicates that the requested data is stored locally at the cache; and
retrieving the requested data from a content store in response to determining that the manifest for the container image indicates that the requested data is not stored locally at the cache.

15. The computer program product of claim 14, wherein:
the container image includes a plurality of files needed to create the container at a node of a cluster of computing nodes, and
the manifest for the container image includes metadata describing the plurality of files within the container image.

16. The computer program product of claim 14, wherein the manifest is retrieved from a repository.

17. The computer program product of claim 14, wherein the manifest includes one or more inode descriptors and file hashes.

18. The computer program product of claim 14, wherein the request to access the requested data includes a file read request.

19. The computer program product of claim 14, wherein the location of the requested data is included within metadata stored within the manifest.

20. The computer program product of claim 14, comprising program instructions executable by the processor to cause the processor to create, by the processor, the container.

21. The computer program product of claim 20, wherein the manifest consists essentially of metadata used to mount the file system and pointers to file data included with the container image.

22. The computer program product of claim 14, comprising program instructions executable by the processor to cause the processor to:
create, by the processor, the container;
receive, by the processor, a command to install a software package in the running container;
retrieve, by the processor, a metadata package for the software package;
install, by the processor, the software package in the running container, utilizing the metadata package;
identify, by the processor, a need for a file during the installation of the software package; and
retrieve, by the processor the file utilizing the metadata package.

23. A system, comprising:
a processor; and
logic integrated with the processor, executable by the processor, or integrated with and executable by the processor, the logic being configured to:
receive a request to create a container;
retrieve a manifest for a container image of the container;
mount a file system for the container utilizing data from the manifest, wherein only the data from the manifest is used to create the file system for the container without fetching any file data;
after creation of the container, identify a request to access data within the container image of the container;
determine, utilizing the manifest for the container image, whether the requested data is located locally in a cache; and
retrieve the requested data from the cache in response to determining that the manifest for the container image indicates that the requested data is stored locally at the cache; and
retrieve the requested data from a content store in response to determining that the manifest for the container image indicates that the requested data is not available locally at the cache.

* * * * *